(12) United States Patent
Akcay et al.

(10) Patent No.: US 11,434,006 B2
(45) Date of Patent: Sep. 6, 2022

(54) SUPPORT MECHANISM

(71) Applicant: TUSAS—TURK HAVACILIK VE UZAY SANAYII ANONIM SIRKETI, Ankara (TR)

(72) Inventors: Ali Akcay, Ankara (AR); Onur Imece, Kazan/Ankara (AR); Sabri Senturk, Kazan/Ankara (AR); Nihat Serkan Akcay, Kazan/Ankara (AR)

(73) Assignee: TUSAS—TURK HAVACILIK VE UZAY SANAYII ANONIM SIRKETI, Ankara (TR)

( * ) Notice: Subject to any disclaimer, the term of this patent is extended or adjusted under 35 U.S.C. 154(b) by 107 days.

(21) Appl. No.: 17/262,140

(22) PCT Filed: Aug. 7, 2019

(86) PCT No.: PCT/TR2019/050659
§ 371 (c)(1),
(2) Date: Jan. 21, 2021

(87) PCT Pub. No.: WO2020/032900
PCT Pub. Date: Feb. 13, 2020

(65) Prior Publication Data
US 2021/0347478 A1 Nov. 11, 2021

(30) Foreign Application Priority Data
Aug. 8, 2018 (TR) .................. 2018/11494

(51) Int. Cl.
B64D 1/04 (2006.01)
(52) U.S. Cl.
CPC ....................... B64D 1/04 (2013.01)
(58) Field of Classification Search
CPC .............. B64D 1/02; B64D 1/04; B64D 1/06
See application file for complete search history.

(56) References Cited

U.S. PATENT DOCUMENTS 2,144,893 A * 1/1939 Parker .................. B64D 1/04
92/25
2,831,400 A * 4/1958 Hosli .................... B64D 1/04
89/1.51
(Continued)

FOREIGN PATENT DOCUMENTS

CN 103072692 A 5/2013
CN 105173086 A 12/2015
(Continued)

OTHER PUBLICATIONS

International Search Report and Written Opinion for corresponding PCT application No. PCT/TR2019/050659, dated Jan. 24, 2020.
(Continued)

Primary Examiner — Richard G Davis
(74) Attorney, Agent, or Firm — Notaro, Michalos & Zaccaria P.C.

(57) ABSTRACT

A support mechanism that has a body, a motor located on the body, a first rod that is triggered by the motor so as to be able to rotate clockwise or counter clockwise around its own axis, a transfer member connected at one end to the first rod, a second rod connected to the transfer member is able to make a radial rotational movement around its own axis together with the first rod by the transfer member, a holder that is located on the body surrounds the second rod and is able to rotate around its own axis and move linearly along a direction that the second rod extends, and at least one bearing that is located on the second rod moves towards or away from the weight upon triggering of the first rod by the motor and contacts the weight for supporting the weight from at least one point.

9 Claims, 4 Drawing Sheets

(56) References Cited

U.S. PATENT DOCUMENTS

| | | | | |
|---|---|---|---|---|
| 3,059,956 | A | * 10/1962 | Geffner | B64D 1/04 |
| | | | | 294/82.26 |
| 5,932,829 | A | * 8/1999 | Jakubowski, Jr. | B64D 1/06 |
| | | | | 294/82.26 |
| 7,950,607 | B1 | 5/2011 | Dickerson | |

FOREIGN PATENT DOCUMENTS

| | | |
|---|---|---|
| EP | 2361831 A2 | 8/2011 |
| KR | 20110062088 A | 6/2011 |

OTHER PUBLICATIONS

Written Opinion of the international Preliminary Examining Authority for corresponding PCT application No. PCT/TR2019/050659, dated Sep. 11, 2020.

International Preliminary Report on Patentability for corresponding PCT application No. PCT/TR2019/050659, completed Oct. 26, 2020.

* cited by examiner

SUPPORT MECHANISM

The invention relates to a support mechanism for supporting a weight from at least one point by contacting the weight.

Throwing systems are used in air vehicles to release or throw ammunition to a target point. In addition, for various carrying systems, there exists throwing mechanisms that allow a weight to be held or released or thrown. Support mechanisms are used in the prior art for balancing the weight attached to said throwing mechanisms.

Patent document with patent number U.S. Pat. No. 7,950,607B1 covered by the prior art discloses a reliable ammunition releasing system which is adapted to operate with different types of ammunition. This document mentions that the ammunition is supported and held at a certain position by support members located at the ammunition releasing system. However, the document does not mention that the support member is extended or retracted along a direction that it extends to reach different distances so that it can provide support at a desired distance in an efficient manner.

Patent application with patent number EP2361831A2 covered by the prior art discloses grippers which are triggered by a motor and allows the ammunition to be hold. However, the patent application does not mention support elements which extend lengthwise so that they are able to rotate around their own axis.

With the support mechanism of the present invention, it is provided that a weight is supported practically, effectively, efficiently and reliably so that it is held at a certain position or a predetermined position.

An object of the present invention is to provide a support mechanism which allows holding weights of different dimensions and shapes at a certain position in an effective manner.

Another object of the present invention is to provide a support mechanism, length of which can be increased or decreased such that the support mechanism contacts the weight efficiently to allow the weight to be hold at a desired position.

Yet a further object of the present invention is to provide a simple, easy-to-use, practical, effective, efficient and reliable support mechanism.

The support mechanism for achieving the object of the present invention which is defined in the first claim and the dependent claims thereof comprises a motor, a first rod which is triggered by the motor so as to be able to rotate clockwise or counter clockwise around its own axis, a transfer member which is attached to the first rod so as to be able to move together with the first rod, a second rod which is attached to the transfer member and rotatable around its own axis together with the first rod by means of the transfer member, a holder which at least partially covers a part of the second rod and allows second rod to be able to rotate around its own axis and also to move along a direction that the second rod extends, and at least one bearing which is located on the second rod, extends outwards from the second rod, approaches the weight (W) together with the second rod and contacts the weight (W) by means of clockwise rotational movement of the second rod around its own axis, allows the weight (W) to be supported from at least one point, and moves away from the weight (W) together with the second rod by means of counter clockwise rotational movement of the second rod around its own axis.

The support mechanism of the present invention comprises a transfer member which allows the first rod and the second rod to move towards or away from each other during rotational movement around its own axis upon transfer of movement by the motor, expands and contracts in the form of a scissor, and has a first bar attached at one end to the first rod, and a second bar connected at one end to the first bar and at other end to the second rod.

In an embodiment of the invention, the support mechanism comprises a transfer member having a first position (I) in which the first rod and the second rod are close to each other and a second position to which the first rod is brought by being rotated around its own axis upon triggering of the first rod by the motor and in which the first rod and the second rod are away from each other, the transfer member having a "V" form when in the second position (II).

In an embodiment of the invention, the support mechanism comprises at least one gear path which is located on the second rod and/or the holder and which allows the second rod to move forward inside the holder by rotating around its own axis.

In an embodiment of the invention, the support mechanism comprises a first pin connecting the first rod and the transfer member with each other and passing through the first rod, a second pin connecting the second rod and the transfer member with each other and passing through the second rod, and a third pin for connecting the first bar and the second bar with each other which are located on the transfer member.

In an embodiment of the invention, the support mechanism comprises at least one bearing located on the second rod in a spherically rotatable manner and extending outwards from the second rod.

In an embodiment of the invention, the support mechanism comprises a weight (W), a bearing contacting the weight (W), and a second rod whose rotational movement around its own axis terminates depending on the power of motor upon contact of the bearing to the weight (W).

In an embodiment of the invention, the support mechanism comprises at least one control unit which controls operation of the motor.

In an embodiment of the invention, the support mechanism comprises a second rod whose rotational movement around its own axis terminates upon contact of the bearing to the weight depending on the power of motor, wherein the torque power of the motor is lower than the frictional force that is created by contact of the bearing to the weight.

In an embodiment of the invention, the support mechanism is suitable for use in balancing the weight (W) at a certain position or a predetermined position, the weight (W) being attached on the throwing unit (T) which is used in air vehicles to throw ammunition and/or to release and/or throw ammunition.

In an embodiment of the invention, the support mechanism is suitable for use in a test system (S) which provides testing the throwing unit (T) used in air vehicles.

The support mechanism realized to achieve the object of the present invention is illustrated in the attached drawings, in which.

Figure 1:
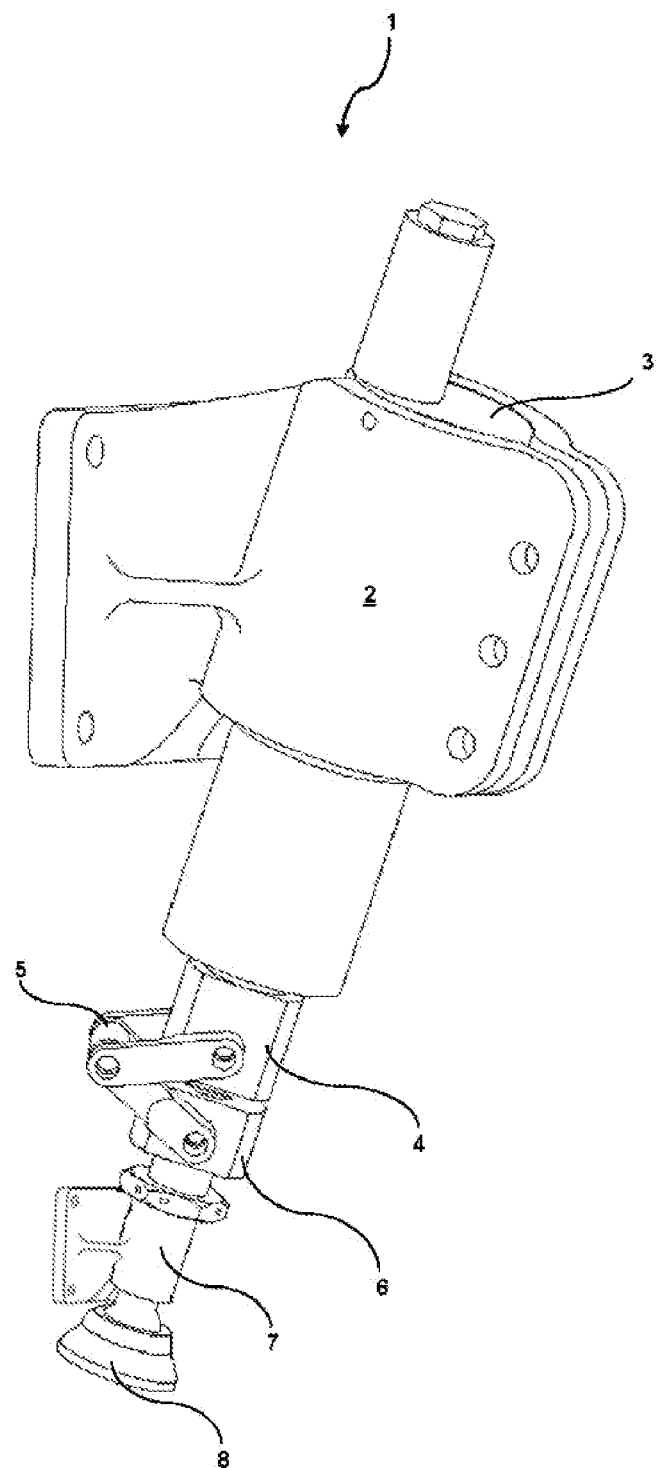
FIG. 1 is a perspective view of a support mechanism.

All the parts illustrated in figures are individually assigned a reference numeral and the corresponding terms of these numbers are listed below:
1. Support mechanism
2. Body
3. Motor
4. First rod
5. Transfer member
6. Second rod
7. Holder
8. Bearing
9. First bar
10. Second bar
11. Gear path
12. First pin
13. Second pin
14. Third pin
15. Control unit The support mechanism (1) comprises a body (2), a motor (3) located on the body (2), a first rod (4) which is triggered by the motor (3) so as to be able to rotate clockwise or counter clockwise around its own axis, a transfer member (5) which is connected at one end to the first rod (4), a second rod (6) which is connected to the transfer member (5) and is able to make a radial rotational movement around its own axis together with the first rod (4) by means of the transfer member (5), a holder (7) which is located on the body (2), surrounds the second rod (6) and allows second rod (6) to be able to rotate around its own axis and also to move linearly along a direction that the second rod (6) extends, and at least one bearing (8) which is located on the second rod (6), moves towards or away from the weight (W) upon triggering of the first rod (4) by the motor (3), and contacts the weight (W) for supporting the weight (W) from at least one point.

The support mechanism (1) of the present invention comprises a transfer member (5) which has a first bar (9) connected at one end to the first rod (4), and a second bar (10) connected at one end to the first bar (9) and at other end to the second rod (6), which allows the first rod (4) and the second rod (6) to move towards or away from each other during rotational movement around its own axis upon being triggered by the motor (3), and which is located between the first rod (4) and the second rod (6) (FIG. 1).

The first rod (4) triggered by the motor (3) makes a rotational movement around its own axis. The second rod (6) rotates together with the first rod (4) by means of the transfer member (5) which is connected to the first rod (4) and the second rod (6). While the second rod (6) surrounded by the holder (7) makes rotational movement around its own axis, it moves forward along the direction it extends to approach the weight (W). Therefore, the bearing (8) contacts the weight (W). Thus, the weight (W) is supported by the bearing (8) from at least one point. Upon being triggered by the motor (3), the first rod (4) rotates around its own axis, but this time in an opposite direction. Similarly, the second rod (6) rotates around its own axis in an opposite direction by means of the transfer member (5). Thus, by means of the holder (7), the second rod (6) moves along the direction that it extends by the reverse rotational movement around its own axis so as to be away from the weight (W). Therefore, contact of the weight (W) with the bearing (8) is ended. The transfer member (5) extends when bearing (8) approaches the weight (W), and the transfer member (5) retracts when bearing (8) moves away from the weight (W). This enables that the support mechanism (1) approaches and contacts or moves away from the weight (W) in a simple and efficient manner.

Figure 2:
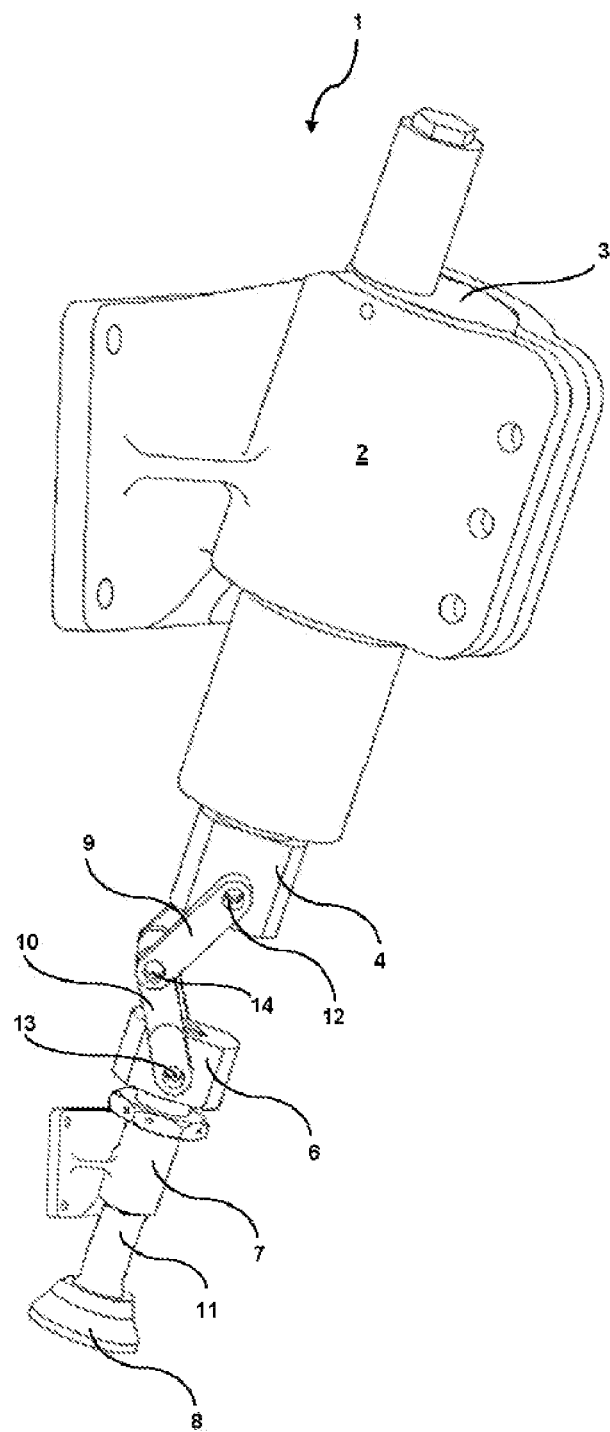
FIG. 2 is a perspective view of a support mechanism when the transfer member is at the second position (II).

In an embodiment of the invention, the support mechanism (1) comprises a transfer member (5) having a first position (I) in which the first rod (4) and the second rod (6) are close to each other and a second position (II) to which the first rod is brought by being rotated around its own axis and in which the first rod (4) and the second rod (6) are away from each other, the transfer member having "V" form when in the second position (II). Having an "I" form when in the first position, the transfer member (5) takes the "V" form while switching from the first position (I) to the second position (II). Due to contracting and expanding structure of the transfer member (5), the support mechanism (1) easily reaches out the weight (W) and can easily be moved away from the weight (W) (FIG. 2).

In an embodiment of the invention, the support mechanism (1) comprises at least one gear path (11) which is located on the second rod (6) and/or the holder (7) and which allows the second rod (6) forward to move inside the holder (7) by rotating around its own axis. The gear path (11) is located on the second rod (6) and/or the holder (7). Thanks to the gear path (11) having an inclined structure, the second rod (6) can further make linear movement along the direction that it extends by rotating around its own axis.

In an embodiment of the invention, the support mechanism (1) comprises a first pin (12) connecting the first rod (4) and the first bar (9) with each other such that the first bar (9) can at least partially move around the connection axis, a second pin (13) connecting the second rod (6) and the second bar (10) with each other such that the second bar (10) can at least partially move around the connection axis and passing through the second bar (10) and the second rod (6), and a third pin (14) for connecting the first bar (9) and the second bar (10) so that they can at least partially move around the connection axis. The support mechanism (1) comprises a first pin (12) preferably having a cylindrical form, connecting the first rod (4) and the first bar (9) with each other such that first bar (9) can at least partially move around the connection axis and passing through the first bar (9) and the first rod (4), a second pin (13) preferably having a cylindrical form, connecting the second rod (6) and the second bar (10) with each other such that the second bar (10) can at least partially move around the connection axis and passing through the second bar (10) and the second rod (6), and a third pin (14) which preferably has a cylindrical form and provides connecting the first bar (9) and the second bar (10) so that they can at least partially move around the connection axis.

In an embodiment of the invention, the support mechanism (1) comprises at least one bearing (8) located on the second rod (6) in a spherically rotatable manner and extending outwards from the second rod (6). The bearing (8) is capable of rotating spherically where it is connected to the second rod (6). Thus, the bearing (8) can efficiently contact inclined surfaces of the weight (W).

In an embodiment of the invention, the support mechanism (1) comprises a weight (W), a bearing (8) contacting the weight (W), and a second rod (6) whose rotational movement around its own axis terminates depending on the power of motor (3) upon contact of the bearing (8) to the weight (W). Power of the motor (3) cannot be sufficient to compensate the frictional force created by contact of the bearing (8) to the weight (W). Thus, it is provided that the bearing (8) contacts the weight (W) so that it continues supporting the weight (W) only by the power of motor (3), without requiring any additional control mechanisms and/or systems.

Figure 3:
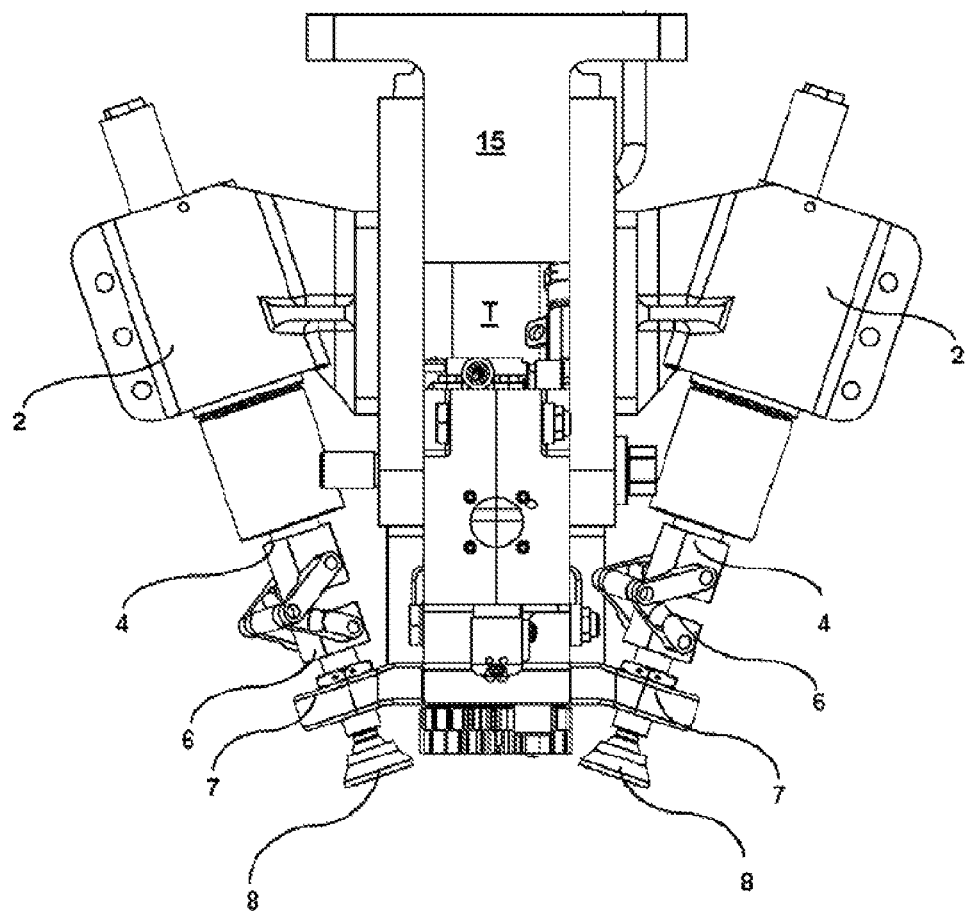
FIG. 3 is a side view of the control unit, the throwing mechanism (T) and the support mechanism.

In an embodiment of the invention, the support mechanism (1) comprises at least one control unit (15) which controls operation of the motor (3). Thanks to the control unit (15), the support mechanism (1) is operated automatically (FIG. 3).

Figure 4:
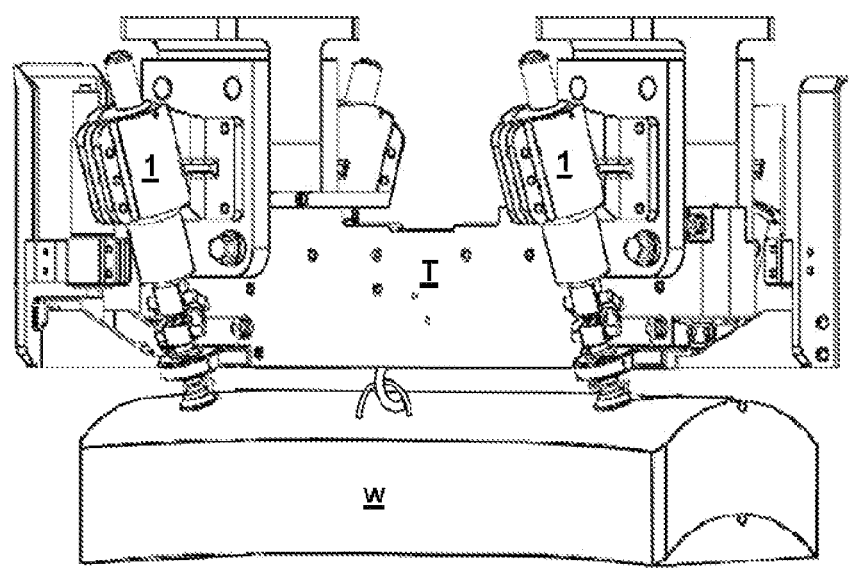
FIG. 4 is a front perspective view of the weight (W), the throwing mechanism (T) and the support mechanism.

In an embodiment of the invention, the support mechanism (1) comprises a second rod (6) whose rotational movement around its own axis terminates upon contact of the bearing (8) to the weight (W) depending on the power of motor (3). Power of the motor (3) cannot be sufficient to compensate the frictional force created by contact of the bearing (8) to weight (W). Therefore, rotational movement of the second rod (6) around its own axis terminates only by the power of motor (3), without requiring any additional control mechanisms and/or systems (FIG. 4).

In an embodiment of the invention, the support mechanism (1) is suitable for use in balancing the weight (VU) which is attached on the throwing unit (T) used in air vehicles to throw and/or release ammunition. The support mechanism (1) provides that the weight (W) attached to the throwing unit remains at a certain position or a predetermined position.

In an embodiment of the invention, the support mechanism (1) is suitable for use in a test device (D) of a throwing unit (T) which provides testing the throwing unit (T) used in air vehicles. Thanks to the support mechanism (1) located on the test device (D) for testing the throwing unit (T); it is provided that the weight (W) attached to the throwing unit (T) remains at a certain position or a predetermined position.

With the support mechanism (1) of the present invention, it is provided that a weight is supported practically, effectively, efficiently and reliably so that it is held at a certain position or a predetermined position.

The invention claimed is:

1. A support mechanism (1) configured to support a weight (W) and comprising a body (2), a motor (3) located on the body (2), a first rod (4) which is triggered by the motor (3) so as to be able to rotate clockwise or counter clockwise around its own axis, a transfer member (5) which is connected at one end to the first rod (4), a second rod (6) which is connected to the transfer member (5) and is able to make a radial rotational movement around its own axis together with the first rod (4) by means of the transfer member (5), a holder (7) which is located on the body (2), configured to surround the second rod (6) and allow the second rod (6) to be able to rotate around its own axis and also to move linearly along a direction that the second rod (6) extends, and at least one bearing (8) which is located on the second rod (6), configured to move towards or away from the weight (W) upon triggering of the first rod (4) by the motor (3), and configured to contact the weight (W) for supporting the weight (W) from at least one point, characterized in that the transfer member (5) has a first bar (9) connected at one end to the first rod (4) and a second bar (10) connected at one end to the first bar (9) and at other end to the second rod (6), wherein the transfer member (5) is configured to allow the first rod (4) and the second rod (6) to move towards or away from each other during rotational movement around its own axis upon being triggered by the motor (3), and wherein the transfer member (5) is located between the first rod (4) and the second rod (6).

2. The support mechanism (1) according to claim 1, characterized in that the transfer member (5) has a first position (I) in which the first rod (4) and the second rod (6) are close to each other and a second position (II) to which the first rod (6) is brought by being rotated around its own axis and in which the first rod (4) and the second rod (6) are away from each other, and the transfer member (5) has a "V" form in the second position (II).

3. The support mechanism (1) according to claim 1, characterized by at least one gear path (11) which is located on the second rod (6) and/or the holder (7) and which allows moving the second rod (6) forward inside the holder (7) by rotating around its own axis.

4. The support mechanism (1) according to claim 1, characterized by a first pin (12) which is configured to connect the first rod (4) and the first bar (9) with each other such that the first bar (9) is able to at least partially move around the connection axis, a second pin (13) which is configured to connect the second rod (6) and the second bar (10) with each other such that the second bar (10) is able to at least partially move around the connection axis and is configured to pass through the second bar (10) and the second rod (6), and a third pin (14) which is configured to connect the first bar (9) and the second bar (10) so that they are able to at least partially move around the connection axis.

5. The support mechanism (1) according to claim 1, characterized in that the bearing (8) is located on the second rod (6) in a spherically rotatable manner and extends outwards from the second rod (6).

6. The support mechanism (1) according to claim 1, characterized in that the bearing (8) is configured to contact the weight (W), and the second rod (6) is configured such that rotational movement around its own axis terminates depending on the power of motor (3) upon contact of the bearing (8) to the weight (W).

7. The support mechanism (1) according to claim 1, characterized by at least one control unit (15) which is configured to control operation of the motor (3).

8. The support mechanism (1) according to claim 1, suitable for use in balancing the weight (W) which is attached on the throwing unit (T) used in air vehicles to throw and/or release ammunition.

9. The support mechanism (1) according to claim 1, suitable for use in a test device of a throwing unit (T) which provides testing of the throwing unit (T) used in air vehicles.

* * * * *